US011969892B2

United States Patent
Tao et al.

(10) Patent No.: US 11,969,892 B2
(45) Date of Patent: Apr. 30, 2024

(54) METHOD, SYSTEM, AND STORAGE MEDIUM FOR SELECTING GRASP POSTURE OF DUAL-ARM ROBOT

(71) Applicant: BEIHANG UNIVERSITY, Beijing (CN)

(72) Inventors: Yong Tao, Beijing (CN); Jiahao Wan, Beijing (CN); Haitao Liu, Beijing (CN); He Gao, Beijing (CN); Yufang Wen, Beijing (CN); Lian Duan, Beijing (CN); Shishu Huang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/230,199

(22) Filed: Aug. 4, 2023

(65) Prior Publication Data
US 2024/0051126 A1    Feb. 15, 2024

(30) Foreign Application Priority Data
Aug. 9, 2022    (CN) .......................... 202210948656.0

(51) Int. Cl.
*B25J 9/00*    (2006.01)
*B25J 9/02*    (2006.01)
(Continued)

(52) U.S. Cl.
CPC ............. *B25J 9/1612* (2013.01); *B25J 9/023* (2013.01); *B25J 9/1638* (2013.01); *G06N 3/12* (2013.01)

(58) Field of Classification Search
CPC ...... B25J 9/1664; B25J 9/0087; B25J 9/1605; B25J 9/1682
See application file for complete search history.

(56) References Cited

U.S. PATENT DOCUMENTS

| | | | |
|---|---|---|---|
| 2006/0171508 A1* | 8/2006 | Noda | A61B 6/4441 378/193 |
| 2007/0156157 A1* | 7/2007 | Nahum | A61B 34/76 606/130 |

(Continued)

FOREIGN PATENT DOCUMENTS

| | | |
|---|---|---|
| CN | 111515949 A | 8/2020 |
| WO | 2018076776 A1 | 5/2018 |

*Primary Examiner* — Dalena Tran
(74) *Attorney, Agent, or Firm* — Bayramoglu Law Offices LLC

(57) ABSTRACT

A method for selecting a grasp posture of a dual-arm robot includes: setting a fitness value range, an iteration quantity threshold, and a fitness function; calculating the fitness value of the population, determining whether the population is within the value range, ending an iteration if the population is within the value range or continuing to determine whether a quantity of iterations reaches the iteration quantity threshold if the population is not within the value range, ending the iteration if the quantity of iterations reaches the iteration quantity threshold or performing crossover and mutation operations if the quantity of iterations does not reach the iteration quantity threshold, and dynamically selecting a gene retention strategy based on an iteration depth and a fitness value to retain a gene; updating a gene population representing a grasping position and performing determining cyclically; and obtaining an optimal target corresponding to dual arms after the iteration.

15 Claims, 8 Drawing Sheets

(51) Int. Cl.
  *B25J 9/16*    (2006.01)
  *G06N 3/12*    (2023.01)

(56) References Cited

U.S. PATENT DOCUMENTS

2021/0183675 A1* 6/2021 Krupyshev .......... B25J 11/0095
2022/0363439 A1* 11/2022 Torres .................... B65D 23/12
2023/0321694 A1* 10/2023 Hegde ................... B07C 5/3422
                                                        209/577

* cited by examiner

| Number | Distance between the center of symmetry and the center of gravity / m | Maximum joint rotation angles of right arm / radian | Maximum joint rotation angles of left arm / radian | Difference between the maximum joint rotation angles of the dual arms / radian |
|---|---|---|---|---|
| 1-1 | 0.006469763 | 2.16698779 | 2.157874888 | 0.032834245 |
| 1-2 | 0.006044471 | 2.185252313 | 2.171570469 | 0.037038326 |
| 2-1 | 0.015206074 | 3.511556748 | 3.537310156 | 0.055719981 |
| 2-2 | 0.008869261 | 3.554235516 | 3.56680667 | 0.058227269 |
| 3-1 | 0.007667295 | 1.458697325 | 1.439311181 | 0.014057227 |
| 3-2 | 0.010640297 | 1.47722438 | 1.465746828 | 0.019738586 |

FIG. 5

| Number | y-coordinate of right arm / m | y-coordinate of left arm / m | z-axis direction of tool coordinates of right arm / degree | z-axis direction of tool coordinates of left arm / degree |
|---|---|---|---|---|
| 1 | -0.275643695 | 0.275643712 | 98.63123241 | 185.0368732 |
| 2 | -0.324260864 | 0.324271257 | 95.87654101 | 178.1034369 |
| 3 | -0.335393401 | 0.335397454 | 99.52401656 | 168.0602646 |
| 4 | -0.216047622 | 0.216050329 | 93.95721507 | 96.21088519 |
| 5 | -0.34512038 | 0.345120718 | 105.8272728 | 166.4190539 |
| 6 | -0.280176918 | 0.280191553 | 106.2804547 | 175.4575168 |
| 7 | -0.30671705 | 0.306719683 | 107.9703186 | 171.056435 |
| 8 | -0.221135611 | 0.221145454 | 98.82627599 | 171.3414071 |
| 9 | -0.366495844 | 0.366500144 | 92.66582514 | 176.076679 |
| 10 | -0.356163729 | 0.356164016 | 104.6026037 | 170.8920629 |
| 11 | -0.329874434 | 0.329889454 | 101.2362246 | 166.5689974 |
| 12 | -0.368030025 | 0.368033841 | 106.5557283 | 171.0209141 |
| 13 | -0.365585735 | 0.365587328 | 91.62529286 | 166.6176932 |
| 14 | -0.373008849 | 0.373010065 | 96.19465578 | 176.3665538 |
| 15 | -0.299743751 | 0.299746479 | 95.12227061 | 176.8267928 |
| 16 | -0.151888288 | 0.151890491 | 95.93621972 | 93.29835201 |
| 17 | -0.327842692 | 0.32784647 | 91.81865196 | 165.7129948 |
| 18 | -0.225300098 | 0.225308426 | 104.3079746 | 175.6785631 |
| 19 | -0.161680611 | 0.161683991 | 107.5551663 | 170.0234055 |
| 20 | -0.28540704 | 0.28541807 | 104.74268 | 171.4785592 |

FIG. 8

| Number | y-coordinate of right arm / m | y-coordinate of left arm / m | z-axis direction of tool coordinates of right arm / degree | z-axis direction of tool coordinates of left arm / degree |
|---|---|---|---|---|
| 1 | -0.117782385 | 0.125767409 | 104.9330172 | 168.6741214 |
| 2 | -0.125155826 | 0.12253494 | 103.9663243 | 170.0655058 |
| 3 | -0.115651799 | 0.1183711 | 101.5094501 | 93.18647015 |
| 4 | -0.11808914 | 0.126475423 | 96.8969996 | 96.64156511 |
| 5 | -0.125286245 | 0.142597054 | 103.2523156 | 172.9299808 |
| 6 | -0.163814027 | 0.16375795 | 102.332559 | 177.9099363 |
| 7 | -0.140528729 | 0.148222608 | 102.3640959 | 171.8511109 |
| 8 | -0.111637556 | 0.108501149 | 95.74187756 | 168.1856054 |
| 9 | -0.130271495 | 0.13336855 | 104.6866157 | 171.7567666 |
| 10 | -0.121180051 | 0.128833417 | 94.24050001 | 95.31201743 |
| 11 | -0.118341254 | 0.11537847 | 93.42670527 | 100.2064634 |
| 12 | -0.131315286 | 0.129142226 | 95.15113721 | 98.47105716 |
| 13 | -0.15227177 | 0.146245001 | 96.12885096 | 174.6929214 |
| 14 | -0.126456997 | 0.126950734 | 99.09886608 | 167.0366454 |
| 15 | -0.11664308 | 0.121650457 | 107.0507104 | 168.2052796 |
| 16 | -0.141786643 | 0.149074087 | 102.8983887 | 173.0253401 |
| 17 | -0.148621857 | 0.159606158 | 101.576054 | 176.3145235 |
| 18 | -0.121359061 | 0.132116221 | 93.91218114 | 170.424799 |
| 19 | -0.132015029 | 0.149436125 | 93.28224601 | 176.0558374 |
| 20 | -0.132091162 | 0.126468711 | 105.4105479 | 171.6035115 |

FIG. 9

METHOD, SYSTEM, AND STORAGE MEDIUM FOR SELECTING GRASP POSTURE OF DUAL-ARM ROBOT

CROSS REFERENCE TO THE RELATED APPLICATIONS

This application is based upon and claims priority to Chinese Patent Application No. 202210948656.0, filed on Aug. 9, 2022, the entire contents of which are incorporated herein by reference.

TECHNICAL FIELD

The present disclosure belongs to the technical field of robots, and specifically relates to a method for selecting a grasp posture of dual-arm robot.

BACKGROUND

With the development of modern industry and the progress of science and technology, people have constantly increased requirements for industrial, healthcare, and service levels. Obviously, a single-arm robot cannot meet requirements of these tasks. In order to adapt to complexity, intelligence, and flexibility requirements of the tasks, a dual-arm robot is proposed. The dual-arm robot, like a human being, has dual arms that can work collaboratively within a certain range. The dual-arm robot is not merely a simple combination of two robotic arms; it also requires achieving coordinated control between the dual arms and adapting to the environment, in addition to pursuing their respective control goals. Therefore, the selection of the posture of dual arms at the end position during grasping tasks is a multi-objective optimization problem that can be computed using genetic algorithms. However, when using the traditional genetic algorithm to select the optimal grasp posture for dual-arm robot based on environmental and task conditions, it often encounters problems such as blindness in initialization, tendency to fall into a local optimum, low computational efficiency, and difficulty in ensuring quality of an obtained target grasp posture. When performing a collaborative task such as synchronously grasping an object, the dual-arm robot fails to fully utilize its advantages of multi-degree-of-freedom flexibility and coordination.

Therefore, in view of this, there is an urgent need for a method of selecting an optimal grasp posture for dual-arm robot to overcome these shortcomings in current practical applications.

SUMMARY

In order to overcome the shortcomings in the prior art, the present disclosure provides a method for selecting an optimal grasp posture of a dual-arm robot based on an improved genetic algorithm, which can avoid blindness in initialization, avoid local optimum, improve computational efficiency, and can fully utilize advantages of multi-degree-of-freedom flexibility and coordination of the dual-arm robot.

The purpose of the present disclosure is achieved by a following technical solution. A method for selecting a grasp posture of a dual-arm robot is provided. The method presented here involves selecting an optimal grasp posture for a dual-arm robot using an improved genetic algorithm, including:

S1: devising a fitness function for the genetic algorithm, taking into account the positional relationship between the dual-arm robot's end effector and the target grasping object, as well as the robot's motion principles, with the aim of minimizing the variation in the end effector's pose during the robot's operation; in this context, establishing the appropriate range of values for the fitness function and set a threshold for the number of iterations, while also determining the initial proportions for crossover and mutation rates in the genetic algorithm;

S2: taking initial postures of the dual arms and a position of the to-be-grasped rod member as constraints for generating an initial population representing a grasping position in the genetic algorithm;

S3: calculating the fitness of each group of genes in the population based on the fitness function designed in the S1;

S4: determining whether the fitness of each group of genes in the population in the S3 is within the set value range of the fitness function in the S1, and performing S9 if the fitness of each group of genes in the population in the S3 is within the set value range of the fitness function in the S1, or performing S5 if the fitness of each group of genes in the population in the S3 is not within the set value range of the fitness function in the S1;

S5: determining whether a quantity of iterations reaches the iteration quantity threshold set in the S1, and performing S9 if the quantity of iterations reaches the iteration quantity threshold set in the S1, or performing S6 if the quantity of iterations does not reach the iteration quantity threshold set in the S1;

S6: obtaining the new-generation population genes in the genetic algorithm through crossover and mutation operations;

S7: for the population genes that are not subjected to the crossover and mutation operations in the S6, dynamically selecting a gene retention strategy to retain the genes based on the iteration depth, fitness value, grasping position, and poses of the end effectors of dual arms;

S8: updating the population genes representing the grasping positions based on the new generation of population genes in the S6 and the retained genes in the S7, then return to the S3; and S9: the optimal genes representing the dual-arm robot's target grasping positions on the to-be-grasped rod member have been obtained by employing the aforementioned methods.

Preferably, the taking initial postures of the dual arms and the positions of the to-be-grasped rod member as constraints for generating the initial population in the S2 specifically includes following content: generating the target grasping points on the axis of the to-be-grasped rod member, where two points representing target positions of the dual arms in each group of genes in the initial population are distributed on two sides of a centroid of the rod member.

Preferably, the fitness function in the S1 specifically includes a symmetric fitness subfunction, a dual-arm collaborative capability fitness subfunction, and a dual-arm synchronization fitness subfunction, which are weighted and combined to calculate the overall fitness function. In addition, the weight value of each fitness subfunction is adjusted based on its iteration depth in the quantity of iterations.

Preferably, the symmetric fitness subfunction considers symmetry of the two grasping point positions in each group of genes relative to the centroid of the rod member, and corresponding formulas are as follows:

$$^m f_{1n} = \frac{1}{\Delta^m x_n^2 + \Delta^m y_n^2 + \Delta^m z_n^2}$$

$$\Delta^m x_n = \frac{^m x_{Ln} - {}^m x_{Rn}}{2} - {}^m x_M,$$

$$\Delta^m y_n = \frac{^m y_{Ln} - {}^m y_{Rn}}{2} - {}^m y_M,$$

$$\Delta^m z_n = \frac{^m z_{Ln} - {}^m z_{Rn}}{2} - {}^m z_M$$

In the above formulas, $^m f_{1n}$ represents the symmetric fitness subfunction, $(x_M, y_M, z_M)$ represents coordinates of the center of gravity of the to-be-grasped rod member, $\Delta x$, $\Delta y$, $\Delta z$ represents the coordinate difference between the center of the line connecting the two target grasping points and the centroid of the rod member, subscripts L and R respectively represent left and right arms, superscript m represents the gene number in each generation of population, and subscript n represents the sequence number of the generation to which the population belongs.

Preferably, the dual-arm collaborative capability fitness subfunction considers the joint with longest running time and a sum of the rotation angle of each joint, and the corresponding formula is as follows:

$$^m f_{2n} = \min\left\{\frac{1}{^m\Theta_{Ln}}, \frac{1}{^m\Theta_{Rn}}\right\}$$

In the above formula, $^m f_{2n}$ represents the dual-arm collaborative capability fitness subfunction, and $\Theta$ represents the sum of the rotation angle of each joint of a robotic arm from an initial posture to a target posture.

The dual-arm synchronization fitness subfunction is intended to ensure the synchronization between the dual arms reaching the target points as much as possible, and the corresponding formula is as follows:

$$^m f_{3n} = \frac{1}{|\max{}^m\theta_{Ln} - \max{}^m\theta_{Rn}|}$$

In the above formula, $^m f_{2n}$ represents the dual-arm synchronization fitness subfunction, and $\theta_L$, $\theta_R$ represents the rotation angle of each joint of the left and right arms.

Preferably, adjusting the weight value of each fitness subfunction based on its iteration depth in the quantity of iterations is specifically as follows: in the early stage of iteration, a same weight is allocated to the three fitness subfunctions; and in the later stage of iteration, the weights of the dual-arm collaborative capability fitness subfunction and the dual-arm synchronization fitness subfunction are increased.

Preferably, specific content of the crossover and mutation operations in the S6 is as follows: the crossover and mutation operations employ an adaptive adjustment technique for the probability, and use, based on the initial crossover and mutation ratios in the S1, the fitness function as a parameter to guide a change to the crossover and mutation ratios.

Preferably, the gene retention strategy in the S7 combines a roulette wheel method and a coverage method. In the early stage of the iteration, the roulette wheel method is used, and in the later stage of the iteration, the coverage method is used based on the fitness value.

Preferably, a system for selecting a grasp posture of the dual-arm robot includes:

a parameter setting module configured to: determine a value range of the fitness function and an iteration quantity threshold with a goal of minimizing the posture change from the initial position to the target position, design the fitness function based on a position relationship between the dual arms and the to-be-grasped rod member and motion laws of the dual arms, and set initial crossover and mutation ratios;

a generation module configured to take initial poses of the dual arms and the position of the to-be-grasped rod member as constraints for generating an initial population, and generate an initial population representing the grasping position;

a calculation module configured to calculate fitness of each group of genes in the population based on the fitness function designed by the parameter setting module;

a determining module configured to perform two-step determining, where the first step is to determine whether the fitness calculated by the calculation module for each group of genes in the population is within the value range set by the parameter setting module for the fitness function, if within the range, obtain the optimal target corresponding to the dual arms, otherwise, proceed to a second step of judgement, which assesses whether the number of iterations has reached the threshold value set in the parameter setting module, if it has, then obtain the optimal target corresponding to the dual arms, otherwise, proceed to the crossover mutation module;

a crossover and mutation module configured to obtain the new-generation population genes through crossover and mutation operations;

a gene retention module is configured to dynamically select a gene retention strategy for population genes that have not been subjected to the crossover and mutation module, based on factors such as the iteration depth of the population gene in the quantity of iterations, its fitness value, the grasping position, and poses of the end effectors of dual arms, aiming to retain these genes by adaptively adjusting the gene retention strategy according to the specified criteria; and an update module configured to update, based on the new-generation population gene obtained by the crossover and mutation module and the gene retained by the gene retention module, the population gene representing the grasping position, and return to the calculation module until the optimal target grasp postures corresponding to the dual arms is obtained.

Preferably, a storage medium is provided. The storage medium is configured to store a computer program. When the computer program runs on a computer, the computer executes the method described above.

The present disclosure can achieve following effects by using the above technical solutions:

The improved genetic algorithm specifically targeting the task of selecting the optimal grasping pose for a dual-arm robot to grasp slender rod-like objects has been proposed. The improvements encompass specific optimizations in the generation of the initial population, the design of the fitness function, and the gene retention strategy. For the generation of the initial population, the position relationship between the initial postures of the dual arms and the to-be-grasped rod member is taken as a constraint for the generation of the initial population, and the generation of the initial population is limited to a reasonable range, so as to create a condition for the algorithm to converge towards a correct target direction from the beginning of a crossover and mutation process. The designed fitness function is flexibly adaptive as the quantity of iterations changes. The weight value of each fitness function is adjusted as the quantity of iterations changes, most important evaluation indicators in different stages are highlighted for gene screening. The fitness function, composed of multiple sub-functions, comprehensively considers three aspects: maximize the symmetry of the grasping points relative to the centroid of the grasped object, minimize the maximum rotation angles of the dual-arm joints, and minimize the difference in maximum rotation angles between the dual-arm joints. The calculation of the fitness function is dynamically adjusted to guide the algorithm to converge along a globally optimal direction, to ultimately obtain an optimal multi-target comprehensive result. The gene retention strategy combines the roulette wheel method and the coverage method to more accurately perform gene updating.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementations of the present disclosure, and a person of ordinary skill in the art may still derive other accompanying drawings from these accompanying drawings without creative efforts.

FIG. 5 shows the comparative experimental results of two genetic algorithms in three sets of experiments according to Embodiment 1;

FIG. 8 shows results of the particle swarm optimization algorithm in three experiments according to Embodiment 1; and FIG. 9 shows results of the improved genetic algorithm in three experiments according to Embodiment 1.

DETAILED DESCRIPTION OF THE EMBODIMENTS

To make the objectives, features, and advantages of the present disclosure more comprehensible, the present disclosure is described in detail below with reference to the accompanying drawings and specific implementations. It should be noted that the embodiments of the present disclosure and features of the embodiments may be combined with each other in case of no conflict.

In the following description, many specific details are set forth in order to facilitate full understanding of the present disclosure, but the present disclosure can also be implemented in other ways than those described herein. Therefore, the present disclosure is not limited by the specific embodiments disclosed below.

Embodiment 1

Figure 1:
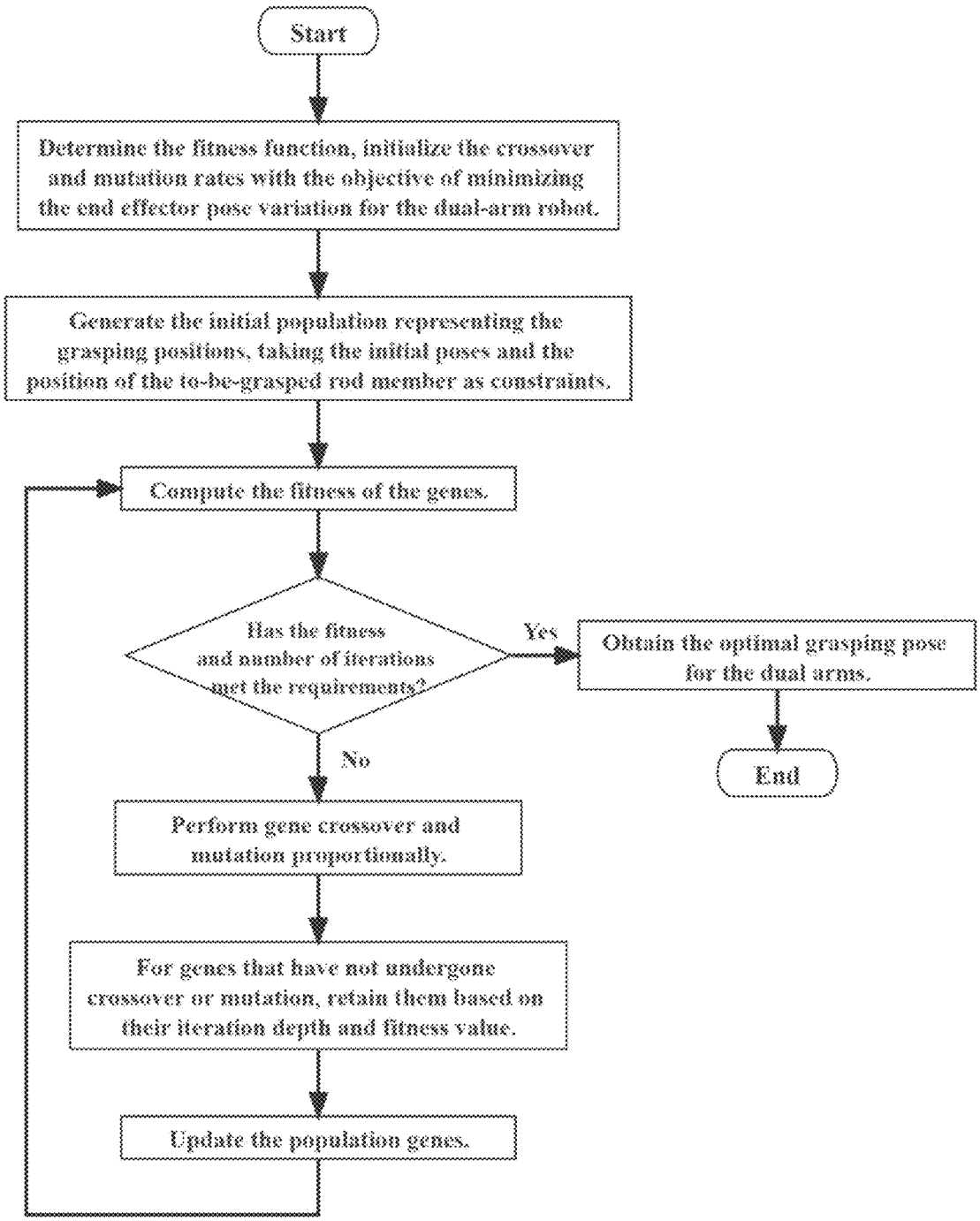
FIG. 1 is an overall flowchart according to the present disclosure.

A method for selecting a grasp posture of a dual-arm robot is using an improved genetic algorithm for selecting an optimal grasp posture of a dual-arm robot. As shown in FIG. 1, the method includes following steps:

S1: A value range of a fitness function and an iteration quantity threshold are determined with a goal of minimizing the posture change from the initial position to the target position of dual arms, the fitness function is designed based on a position relationship between the dual arms and a to-be-grasped rod member and motion laws of the dual arms, and initial crossover and mutation ratios are set. There is no specific requirement for setting the value range of the fitness function herein, as long as the goal of minimizing the posture change from the initial position to the target position of dual arms can be achieved, and there is also no specific limit on the iteration quantity threshold, the initial crossover and mutation ratios, and specific content of the fitness function. In this embodiment, coordinates of two target points corresponding to the dual-arm robot on the rod member, and a z-axis direction of tool coordinates during grasping are directly used as genes to simplify calculation. The fitness function is a weighted calculation of a plurality of dynamic fitness functions. In this embodiment, the plurality of dynamic fitness functions are a symmetric fitness subfunction, a dual-arm collaborative capability fitness subfunction, and a dual-arm synchronization fitness subfunction, and a weight value of each fitness subfunction is adjusted based on a change of the quantity of iterations. In an early stage of an iteration performed by a genetic algorithm, the three fitness subfunctions are given a same weight. In a later stage of the iteration, proportions of the dual-arm collaborative capability fitness subfunction and the dual-arm synchronization fitness subfunction are increased.

In this embodiment, the symmetric fitness subfunction considers symmetry of the two grasping point positions in each group of genes relative to a centroid of the rod member, and corresponding formulas are as follows:

$$^m f_{1n} = \frac{1}{\Delta^m x_n^2 + \Delta^m y_n^2 + \Delta^m z_n^2}$$

$$\Delta^m x_n = \frac{^m x_{Ln} - ^m x_{Rn}}{2} - ^m x_M,$$

$$\Delta^m y_n = \frac{^m y_{Ln} - ^m y_{Rn}}{2} - ^m y_M,$$

$$\Delta^m z_n = \frac{^m z_{Ln} - ^m z_{Rn}}{2} - ^m z_M$$

In the above formulas, $^m f_{1n}$ represents the symmetric fitness subfunction, $(x_M, y_M, z_M)$ represents coordinates of the center of gravity of the to-be-grasped rod member, $\Delta x$, $\Delta y$, $\Delta z$ represents the coordinate difference between a center of a line connecting the two target grasping points and the centroid of the rod member, subscripts L and R respectively represent left and right arms, superscript m represents a gene number in each generation of population, and subscript n represents a sequence number of the generation to which the population belongs. According to the above formulas, better symmetry of the two target grasping points relative to the centroid of the rod member and a smaller coordinate difference leads to a larger weight of the symmetry fitness function $^m f_{1n}$ and a better gene.

The dual-arm collaborative capability fitness subfunction considers the joint with longest running time and a sum of the rotation angle of each joint, and the corresponding formula is as follows:

$$^m f_{2n} = \min \left\{ \frac{1}{^m \Theta_{Ln}}, \frac{1}{^m \Theta_{Rn}} \right\}$$

In the above formula, $^m f_{2n}$ represents the dual-arm collaborative capability fitness subfunction, and $\Theta$ represents a sum of the rotation angle of each joint of a robotic arm from initial posture to target posture. Execution efficiency of an entire task depends on the joint with the longest running time of the dual arms, and the generated target grasping point is considered to minimize the rotation angle of each joint of corresponding robotic arm from initial posture to grasp posture.

The dual-arm robot's grasping process should ensure simultaneous reaching of corresponding target points by both arms, enabling synchronous grasping. This prevents the concentration of the rod member's gravity on one side of the robotic arm during unsynchronized grasping operations. An existing dual-arm robot adopts a strategy of synchronously starting grasping after dual arms reach the target grasping points. A main method is that a single robotic arm that first reaches the target point needs to wait for the other robotic arm to arrive. In this way, a goal of improving efficiency cannot be achieved. In addition, due to excessive consideration of efficiency of a single robotic arm reaching the target point (in other words, sub-fitness represented by $^m f_{2n}$) other fitness considerations such as point symmetry (in other words, sub-fitness represented by $^m f_{1n}$) may be weakened. To avoid this situation, a formula for the dual-arm synchronization fitness subfunction is designed as follows:

$$^m f_{3n} = \frac{1}{|\max ^m \theta_{Ln} - \max ^m \theta_{Rn}|}$$

In the above formula, $^m f_{3n}$ represents the dual-arm synchronization fitness subfunction, and $\Theta_L$, $\Theta_R$ represents a rotation angle of each joint of the left and right arms.

The three fitness subfunctions are considered comprehensively, and are assigned different weights based on different situations. An overall fitness function formula is as follows:

$$^m f_n = \alpha ^m f_{1n} + \beta ^m f_{2n} + \gamma ^m f_{3n}$$

In the above formula, $\alpha$, $\beta$, $\gamma \in (0,1)$. When the genetic algorithm starts to perform the iteration, it is necessary to quickly find coordinates of a suitable target point on an axis of the rod member based on a constraint and retain some genes that are not excellent. Because a gene that is not superior in the early stage may become optimal in the later stage, the three sub-fitness weights are given the same weight in the early stage, and proportions of D and y are appropriately increased in the later stage of the iteration. A focus is to select an optimal grasping posture at the end effectors of dual arms and optimize a collaborative grasping capability of the dual arms.

Figure 2:
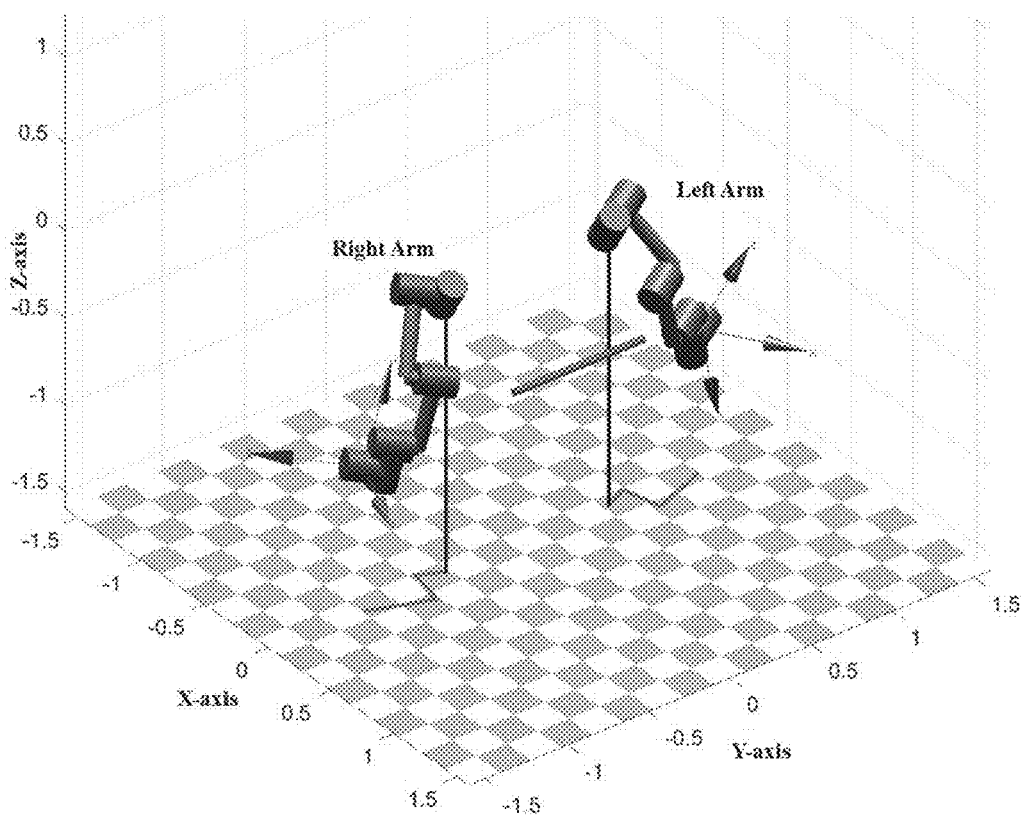
FIG. 2 shows an initial posture of dual-arm robot according to Embodiment 1.

S2: Initial postures of the dual arms and a position of the to-be-grasped rod member are taken as constraints for generating an initial population, to generate an initial population representing a grasping position. An initial stage of the dual-arm robot in this embodiment is shown in FIG. 2. In this embodiment, the target grasping points are generated on the axis of the to-be-grasped rod member, and the initial population consists of gene pairs, each representing two points indicating the target positions of the dual arms, distributed on either side of the centroid of the rod member. On one hand, it is necessary to ensure that the target grasping point is generated on the axis of the to-be-grasped rod member, and that the target point can guide the robotic arm to accurately grasp the rod member. On the other hand, the initial population should be arranged in a particular manner. In each group of genes, the two points representing the target positions of the dual arms should be distributed on either side of the centroid of the rod member. This is to avoid both points being generated on the same side of the rod member's centroid. In this way, the dual arms can grasp the rob member on the two sides of the centroid, meeting a reasonable force structure and approaching an optimal grasping position. The initial population that meets requirements of these two aspects avoids excessive randomness and enables the genetic algorithm to update the population around a correct direction in a subsequent gene crossover and mutation process, to obtain a high-quality result through iteration as soon as possible. A limiting formula for generating the initial population is as follows:

$$P_0 = (^1T_{L0}, ^2T_{L0}, \ldots, ^mT_{L0}, ^1T_{R0}, ^2T_{R0}, \ldots, ^mT_{R0})$$

$$T_{L0} \in O_L$$

$$T_{R0} \in O_R$$

In the above formula, $P_0$ represents the initial population, the subscript n represents the sequence number of the generation to which the population belongs, the subscripts L and R respectively represent the left and right arms, the superscript m represents the gene number in each generation of population, $O_L$ and $O_R$ represent regions on the two sides of the centroid of the axis of the to-be-grasped rod member, and $T_L$ and $T_R$ represent the correspondingly generated target points of the dual arms.

S3: Fitness of each group of genes in the population is calculated based on the fitness function designed in the S1.

S4: Whether the fitness of each group of genes in the population in the S3 is within the set value range of the fitness function in the S1 is determined, and S9 is performed if the fitness of each group of genes in the population in the S3 is within the set value range of the fitness function in the S1 or S5 is performed if the fitness of each group of genes in the population in the S3 is not within the set value range of the fitness function in the S1.

S5: Whether a quantity of iterations reaches the iteration quantity threshold set in the S1 is determined, and S9 is performed if the quantity of iterations reaches the iteration quantity threshold set in the S1 or S6 is performed if the quantity of iterations does not reach the iteration quantity threshold set in the S1.

S6: A new-generation population gene is obtained through crossover and mutation operations. In this embodiment, the crossover and mutation operations adopt an adaptive adjustment technology, and the fitness function is used as a parameter based on the initial crossover and mutation ratios in the S1 to guide a change to the crossover and mutation ratios. Corresponding formulas are as follows:

$$P_C = P_{C0} e^{-\lambda f}$$

$$P_R = P_{R0} e^{-\varphi f}$$

In the above formulas, $P_C$, $P_R$ respectively represent the crossover and mutation ratios, $P_{C0}$, $P_{R0}$ respectively represent reference values of the set initial crossover and mutation ratios, and $\lambda$, $\varphi$ represent adjustment coefficients, which can be modified to adjust degrees of influence of the fitness function on the crossover and mutation ratios respectively.

S7: For a population gene that are not subjected to in the crossover and mutation operations in the S6, a gene retention strategy is dynamically selected based on an iteration depth of the population gene in the quantity of iterations, fitness value, grasping position, and postures at the end effectors of dual arms, to retain the gene. In this embodiment, specific content of the gene preservation strategy is to use a roulette wheel method in the early stage of the iteration, and to use a coverage method based on the fitness value in the later stage of the iteration. In the early stage of the iteration, the commonly used roulette wheel method of the genetic algorithm is selected. Characteristics of an advantageous gene cannot be comprehensively represented in the early stage of the iteration, and the calculation of the fitness function also changes dynamically. In this case, if a gene that enters a next iteration is selected solely based on the fitness value, a gene with a potential to evolve into a high-fitness gene may be excluded in advance. In the early stage, due to a plurality of factors such as the grasping position and a posture of the end effectors of dual arms, overall fitness is uncertain. Therefore, in the early stage, an opportunity should be given to more genes to continue the iteration. In the later stage of the iteration, the coverage method is used to choose to retain a high-fitness gene based on the fitness value. A difference between genes in the later stage of the iteration is not significant, and it is necessary to select an optimal solution as soon as possible for preservation. In the later stage, for the fitness, an emphasis is imposed on the grasping posture of the end effector, and there are fewer influencing factors. Therefore, the coverage method is used to exclude a gene that has already shown a disadvantage.

S8: A population gene representing the grasping position is updated based on the new-generation population gene in the S6 and the gene retained in the S7, and the S3 is performed.

Figure 3:
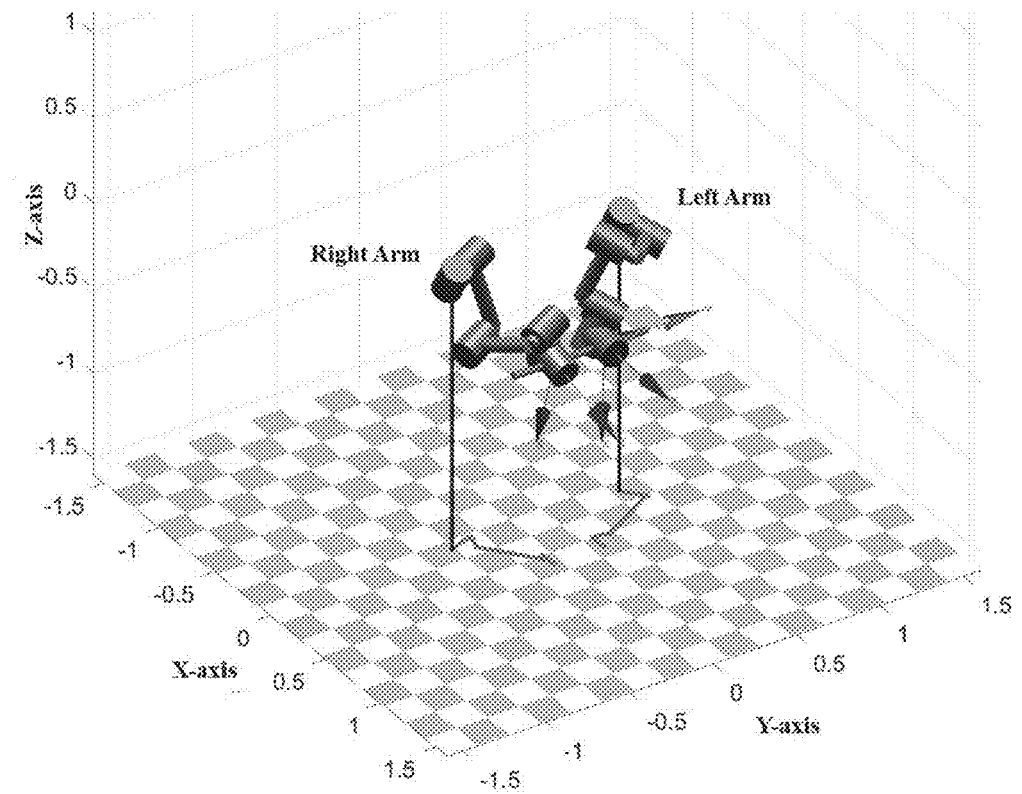
FIG. 3 shows an optimal target posture of dual-arm robots according to Embodiment 1.

S9: An optimal target corresponding to the dual arms is obtained, as shown in FIG. 3.

Figure 4A:
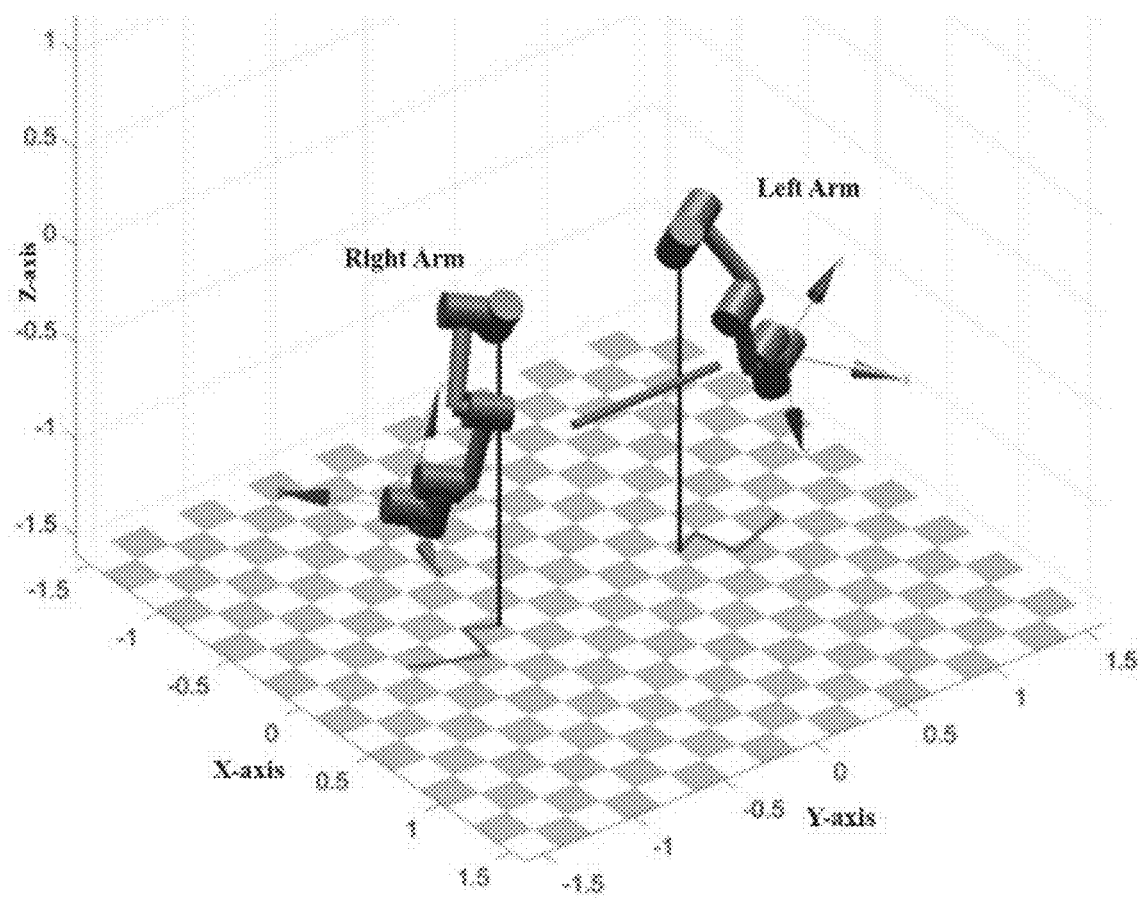
FIGS. 4A-4C show initial postures in three experiments according to Embodiment 1.
Figure 4B:
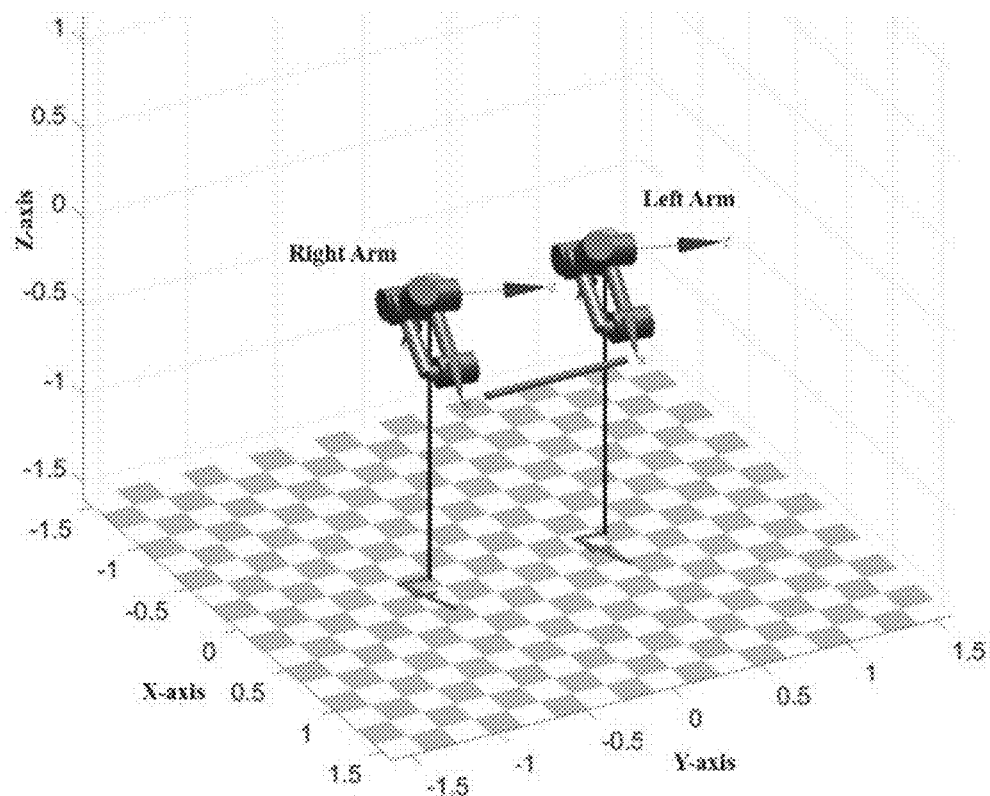
Figure 4C:
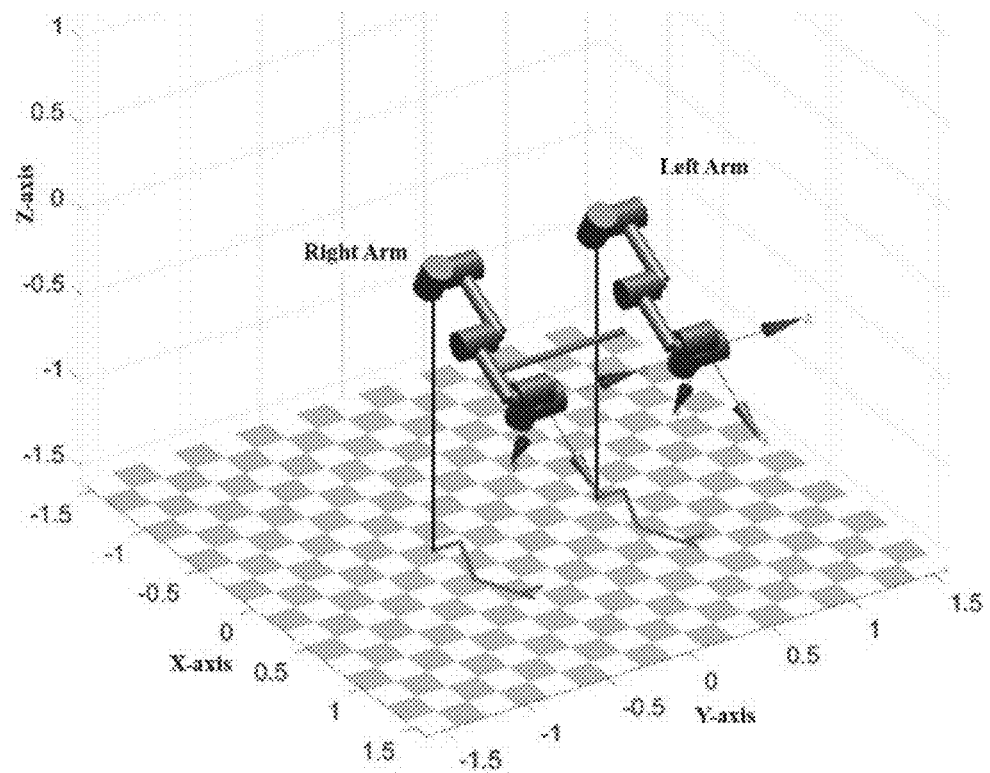
Figure 6:
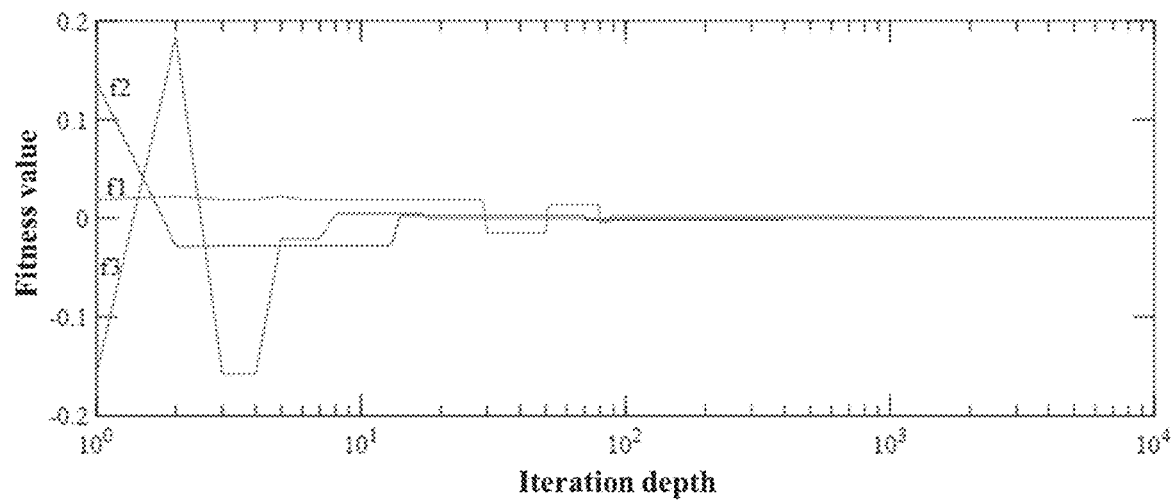
FIG. 6 shows the fitness convergence trend of an improved genetic algorithm in a first experiment of three experiments according to Embodiment 1.
Figure 7:
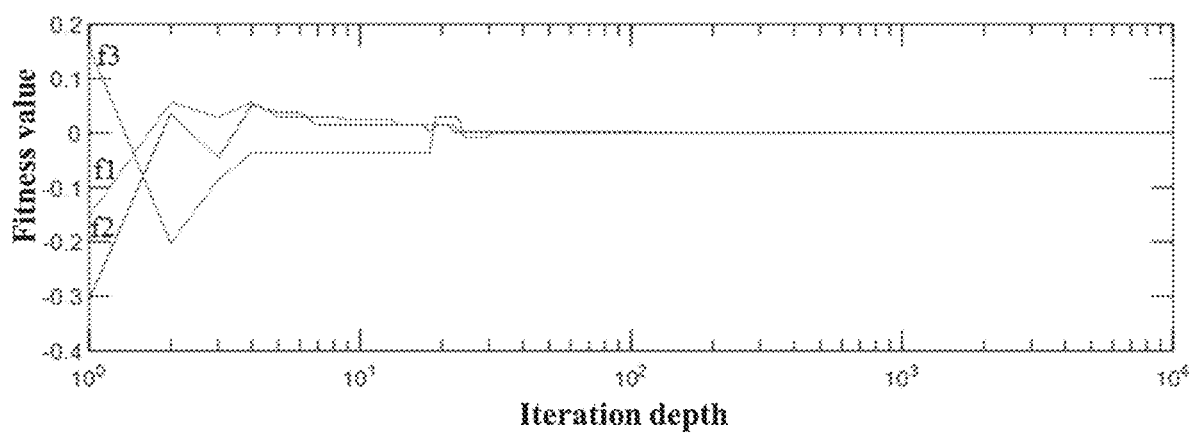
FIG. 7 shows the fitness convergence trend of an unimproved genetic algorithm in a first experiment of three experiments according to Embodiment 1.

FIGS. 4A-4C show three initial postures of the dual arms in this embodiment. The three initial postures are as follows: the dual arms are symmetrical, the dual arms are about to reach the position of maximum joint rotation, and the dual arms are in an initial zero position. The three postures can basically represent three possible cases in an actual working condition. For the three initial postures, a comparative experiment is conducted using unimproved and improved algorithms. In order to enhance persuasiveness of the experiment, reduce randomness of the experiment, 20 repeated experiments are conducted for each case, and an average value of results of the repeated experiments is taken for comparison. The results are shown in FIG. 5. For the three different postures, the average value of the results obtained from the 20 repeated experiments for each case shows that the improved genetic algorithm is greatly improved in various comparative indicators compared with the unimproved genetic algorithm. Obtained grasping positions and postures realize better symmetry of the grasping positions of the dual robotic arms on the rod member relative to the center of gravity of the rod member. Maximum joint rotation angles of the right and left arms from the initial posture to the grasping posture are respectively reduced by 1.23% and 1.51% on average, and a difference between the maximum joint rotation angles of the dual arms is also reduced by 14.26% on average. All the three goals have been further optimized. FIG. 6 shows a fitness convergence trend of the improved genetic algorithm for a first initial posture shown in FIGS. 4A-4C. In middle and later stages of the iteration, the fitness is adjusted, allowing more excellent genes to be considered. FIG. 7 shows a fitness convergence trend of the unimproved genetic algorithm for the first initial posture shown in FIGS. 4A-4C. The fitness of the unimproved genetic algorithm remains basically unchanged in the middle stage of the iteration, in other words, the unimproved genetic algorithm enters early convergence, and there is a possibility of discarding a globally optimal gene. This embodiment is also compared with a particle swarm optimization algorithm. Similarly, the three initial postures shown in FIGS. 4A-4C are used, and 20 repeated experiments are also carried out. Results obtained by the particle swarm optimization algorithm are shown in FIG. 8. Results obtained by the algorithm selected in this embodiment are shown in FIG. 9. By comparison, symmetry that is of the target point relative to the center of gravity of the rod member and is obtained by the particle swarm optimization algorithm is better, but the maximum rotation angles of the dual robotic arms and the rotation angle difference are unstable, and an average value of the 20 experiments is also larger compared with a result obtained by the improved genetic algorithm. Although the algorithm selected in this embodiment has some shortcomings in the symmetry of the grasping points, the results are more stable and the three goals are the best on the whole.

This embodiment optimizes the generation of the initial population based on the initial postures of the dual arms in operating space and a spatial position of a to-be-grasped object, to limit the generation of the initial population to a reasonable range. This avoids excessive randomness, and enables the genetic algorithm to update the population around the correct direction in the subsequent gene crossover and mutation process, to obtain the high-quality result through iteration as soon as possible. The fitness function is improved to take into account the symmetry, the maximum joint rotation angles of the dual arms and the rotation angle difference of the dual arms in a grasping process, and adaptively adjust the fitness function based on the iteration depth. It is comprehensively considered that it is necessary to find the coordinates of the appropriate target point on the axis of the rod member as soon as possible based on the constraint, while retaining some genes that are not excellent in the early stage. This is because the gene that is not superior in the early stage may become optimal in the later stage. In the later stage of the iteration, the focus is to select the optimal grasping posture at the end effectors of dual arms and optimize the collaborative grasping capability of the dual arms. Therefore, the weight of the fitness subfunction is set for adjustment based on the iteration depth. In the crossover and mutation process, the fitness function is used as the parameter to guide the algorithm to converge in a globally optimal direction. The gene retention strategy combines the roulette wheel method and the coverage method to update the gene more accurately. Finally, coordinates and grasping postures of optimal grasping points of the dual arms on the object are obtained.

Embodiment 2

A system for selecting a grasp posture of a dual-arm robot includes a parameter setting module, a generation module, a calculation module, a determining module, a crossover and mutation module, a gene retention module, and an update module.

The parameter setting module is configured to determine a value range of a fitness function and an iteration quantity threshold with a goal of minimizing the posture change from the initial position to the target position of dual arms, design the fitness function based on a position relationship between the dual arms and a to-be-grasped rod member and motion laws of the dual arms, and set initial crossover and mutation ratios. There is no specific requirement for setting the value range of the fitness herein, as long as the goal of minimizing the posture change from the initial position to the target position of dual arms can be achieved, and there is also no specific limit on the iteration quantity threshold, the initial crossover and mutation ratios, and specific content of the fitness function. In this embodiment, coordinates of two target points corresponding to the dual-arm robot on the rod member, and a z-axis direction of tool coordinates during grasping are directly used as genes to simplify calculation. The fitness function is a weighted calculation of a plurality of dynamic fitness functions. The plurality of dynamic fitness functions are a symmetric fitness subfunction, a dual-arm collaborative capability fitness subfunction, and a dual-arm synchronization fitness subfunction, and a weight value of each fitness subfunction is adjusted based on a change of the quantity of iterations. In an early stage of an iteration performed by a genetic algorithm, the three fitness subfunctions are given a same weight. In a later stage of the iteration, proportions of the dual-arm collaborative capability fitness subfunction and the dual-arm synchronization fitness subfunction are increased. In this embodiment, the symmetric fitness subfunction considers symmetry of two grasping points in each group of genes relative to a centroid of the rod member, and corresponding formulas are as follows:

$$^{m}f_{1n} = \frac{1}{\Delta^{m}x_{n}^{2} + \Delta^{m}y_{n}^{2} + \Delta^{m}z_{n}^{2}}$$

$$\Delta^{m}x_{n} = \frac{^{m}x_{Ln} - {^{m}x_{Rn}}}{2} - {^{m}x_{M}},$$

$$\Delta^{m}y_{n} = \frac{^{m}y_{Ln} - {^{m}y_{Rn}}}{2} - {^{m}y_{M}},$$

$$\Delta^{m}z_{n} = \frac{^{m}z_{Ln} - {^{m}z_{Rn}}}{2} - {^{m}z_{M}}$$

In the above formulas, $^{m}f_{1n}$ represents the symmetric fitness subfunction, $(x_{M}, y_{M}, z_{M})$ represents coordinates of a center of gravity of the to-be-grasped rod member, represents a coordinate difference between a center of a line connecting the two target grasping points and the centroid of the rod member, subscripts L and R respectively represent left and right arms, superscript m represents the gene number in each generation of population, and subscript n represents the sequence number of a generation to which the population belongs. According to the above formulas, better symmetry of the two target grasping points relative to the centroid of the rod member and a smaller coordinate difference lead to a larger weight of the symmetry fitness function $^{m}f_{1n}$ and a better gene.

The dual-arm collaborative capability fitness subfunction considers a joint with longest running time and a sum of a rotation angle of each joint, and a corresponding formula is as follows:

$$^{m}f_{2n} = \min\left\{\frac{1}{^{m}\Theta_{Ln}}, \frac{1}{^{m}\Theta_{Rn}}\right\}$$

In the above formula, $^{m}f_{2n}$ represents the dual-arm collaborative capability fitness subfunction, and $\Theta$ represents a sum of a rotation angle of each joint of a robotic arm from an initial posture to a target posture. Execution efficiency of an entire task depends on the joint with the longest running time of the dual arms, and the generated target grasping point is considered to minimize a rotation angle of each joint of a corresponding robotic arm from an initial posture to a grasp posture.

A process of grasping the rod member by the dual-arm robot should ensure that the dual arms can reach the corresponding target points simultaneously, and carry out synchronous grasping to prevent unsynchronized grasping operations from concentrating all gravity of the rod member on a robotic arm on one side. An existing dual-arm robot even adopts a strategy of synchronously starting grasping after dual arms reach the target grasping points. A main method is that a single robotic arm that first reaches the target point needs to wait for the other robotic arm to arrive. In this way, a goal of improving efficiency cannot be achieved. On the contrary, due to excessive consideration of efficiency of a single robotic arm reaching the target point (in other words, sub-fitness represented by $^m f_{2n}$), other fitness considerations such as point symmetry (in other words, sub-fitness represented by $^m f_{1n}$) may be weakened. To avoid this situation, a formula for the dual-arm synchronization fitness subfunction is designed as follows:

$$^m f_{3n} = \frac{1}{|\max{}^m \theta_{Ln} - \max{}^m \theta_{Rn}|}$$

In the above formula, $^m f_{3n}$ represents the dual-arm synchronization fitness subfunction, and $\theta_L$, $\theta_R$ represents a rotation angle of each joint of the left and right arms.

The three fitness subfunctions are considered comprehensively, and are assigned different weights based on different situations. An overall fitness function formula is as follows:

$$^m f_n = \alpha {}^m f_{1n} + \beta {}^m f_{2n} + \gamma {}^m f_{3n}$$

In the above formula, $\alpha$, $\beta$, $\gamma \in (0,1)$. When the genetic algorithm starts to perform the iteration, it is necessary to quickly find coordinates of a suitable target point on an axis of the rod member based on a constraint and retain some genes that are not excellent. Because a gene that is not superior in the early stage may become optimal in the later stage, the three sub-fitness weights are given the same weight in the early stage, and proportions of $\beta$ and $\gamma$ are appropriately increased in the later stage of the iteration. A focus is to select an optimal grasping posture at the end effectors of dual arms and optimize a collaborative grasping capability of the dual arms.

The generation module is configured to take initial postures of the dual arms and a position of the to-be-grasped rod member as constraints for generating an initial population, to generate an initial population representing a grasping position. In this embodiment, the target grasping points are generated on the axis of the to-be-grasped rod member, and two points representing target positions of the dual arms in each group of genes in the initial population are distributed on two sides of the centroid of the rod member. On one hand, it is necessary to ensure that the target grasping point is generated on the axis of the to-be-grasped rod member, and that the target point can guide the robotic arm to accurately grasp the rod member. On the other hand, On the other hand, the initial population should be arranged in a particular manner. In each group of genes, the two points representing the target positions of the dual arms should be distributed on either side of the centroid of the rod member. This is to avoid both points being generated on the same side of the rod member's centroid. In this way, the dual arms can grasp the rob member on the two sides of the centroid, meeting a reasonable force structure and approaching an optimal grasping position. The initial population that meets requirements of these two aspects avoids excessive randomness and enables the genetic algorithm to update the population around a correct direction in a subsequent gene crossover and mutation process, to obtain a high-quality result through iteration as soon as possible. A limiting formula for generating the initial population is as follows:

$$P_0 = (^1 T_{L0}, {}^2 T_{L0}, \ldots, {}^m T_{L0}, {}^1 T_{R0}, {}^2 T_{R0}, \ldots, {}^m T_{R0}$$

$$T_{L0} \in O_L$$

$$T_{R0} \in O_R$$

In the above formula, $P_0$ represents the initial population, the subscript n represents a sequence number of a generation to which the population belongs, the subscripts L and R respectively represent the left and right arms, the superscript m represents the gene number in each generation of population, $O_L$ and $O_R$ represent regions on the two sides of the centroid of the axis of the to-be-grasped rod member, and $T_L$ and $T_R$ represent the correspondingly generated target points of the dual arms.

The calculation module is configured to calculate fitness of each group of genes in the population based on the fitness function designed by the parameter setting module.

The determining module is configured to perform two-step determining, where a first step is to determine whether the fitness calculated by the calculation module for each group of genes in the population is within the value range set by the parameter setting module for the fitness function, and obtain an optimal target corresponding to the dual arms if the fitness calculated by the calculation module for each group of genes in the population is within the value range set by the parameter setting module for the fitness function or perform a second step if the fitness calculated by the calculation module for each group of genes in the population is not within the value range set by the parameter setting module for the fitness function; and the second step is to determine whether a quantity of iterations reaches the iteration quantity threshold set by the parameter setting module, and obtain the optimal target corresponding to the dual arms if the quantity of iterations reaches the iteration quantity threshold set by the parameter setting module or execute a crossover and mutation module if the quantity of iterations does not reach the iteration quantity threshold set by the parameter setting module.

The crossover and mutation module is configured to obtain a new-generation population gene through crossover and mutation operations. In this embodiment, the crossover and mutation operations adopt an adaptive adjustment technology, and the fitness function is used as a parameter based on the initial crossover and mutation ratios set by the parameter setting module to guide a change to the crossover and mutation ratios. Corresponding formulas are as follows:

$$P_C = P_{C0} e^{-\lambda f}$$

$$P_R = P_{R0} e^{-\varphi f}$$

In the above formulas, $P_C$, $P_R$ respectively represent the crossover and mutation ratios, $P_{C0}$, $P_{R0}$ respectively represent reference values of the set initial crossover and mutation ratios, and $\lambda$, $\varphi$ represent adjustment coefficients, which can be modified to adjust degrees of influence of the fitness function on the crossover and mutation ratios respectively.

The gene retention module is configured to: for a population gene that is not processed by the crossover and mutation module, dynamically select a gene retention strategy based on an iteration depth of the population gene in the quantity of iterations, a fitness value, the grasping position, and postures at the end effectors of dual arms, to retain the gene. In this embodiment, specific content of the gene preservation strategy is to use a roulette wheel method in the early stage of the iteration, and to use a coverage method based on the fitness value in the later stage of the iteration. In the early stage of the iteration, the commonly used roulette wheel method of the genetic algorithm is selected. Characteristics of an advantageous gene cannot be comprehensively represented in the early stage of the iteration, and the calculation of the fitness function also changes dynamically. In this case, if a gene that enters a next iteration is selected solely based on the fitness value, a gene with a potential to evolve into a high-fitness gene may be excluded in advance. In the early stage, due to a plurality of factors such as the grasping position and the poses of the end effectors of dual arms, overall fitness is uncertain. Therefore, in the early stage, an opportunity should be given to more genes to continue the iteration. In the later stage of the iteration, the coverage method is used to choose to retain a high-fitness gene based on the fitness value. A difference between genes in the later stage of the iteration is not significant, and it is necessary to select an optimal solution as soon as possible for preservation. In the later stage, for the fitness, an emphasis is imposed on the grasping posture of the end effectors of dual arms, and there are fewer influencing factors. Therefore, the coverage method is used to exclude a gene that has already shown a disadvantage.

The update module is configured to update, based on the new-generation population gene obtained by the crossover and mutation module and the gene retained by the gene retention module, a population gene representing the grasping position, and return to the calculation module until the optimal target corresponding to the dual arms is obtained.

Embodiment 3

This embodiment provides a computer-readable storage medium that stores a computer program. The computer program is executed by a processor of a computing device to implement the method according to Embodiment 1.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that modifications may be made to the technical solutions described in the above embodiments or equivalent replacements may be made to some or all technical features thereof, which do not make the essence of corresponding technical solutions depart from the scope of the technical solutions in the examples of the present disclosure.

What is claimed is:

1. A method for selecting an optimal grasp posture of a dual-arm robot based on an improved genetic algorithm, comprising:
S1: determining a value range of a fitness function and an iteration quantity threshold with a goal of minimizing the posture variation at the end effectors of dual arms, designing the fitness function based on the position relationship between the dual arms and the to-be-grasped rod member and motion laws of the dual arms, then setting initial crossover and mutation ratios;
S2: taking initial postures of the dual arms and the position of the to-be-grasped rod member as constraints for generating an initial population representing the grasping position; the above specific content of taking the initial postures of the dual arms and the position of the target to-be-grasped rod member as constraints for generating an initial population are as follows: the target grasping points are generated on the axis of the target object to be grasped, and the initial population of each gene group contains two points representing the dual-arm target positions distributed on both sides of the object's centroid;
S3: calculating fitness of each group of genes in the population based on the fitness function designed in the S1;
S4: determining whether the fitness of each group of genes in the population in the S3 is within the set value range of the fitness function in the S1, and performing S9 if the fitness of each group of genes in the population in the S3 is within the set value range of the fitness function in the S1, otherwise, performing S5;
S5: determining whether a quantity of iterations reaches the iteration quantity threshold set in the S1, and performing S9 if the quantity of iterations reaches the iteration quantity threshold set in the S1, otherwise, performing S6;
S6: obtaining a new-generation population genes through crossover and mutation operations;
S7: for the population genes that are not subjected to the crossover and mutation operations in the S6, dynamically selecting a gene retention strategy to retain the genes based on the iteration depth of the population genes in the quantity of iterations, the fitness value, the grasping position, and postures at the end effectors of the dual arms;
S8: updating the population genes representing the grasping position based on the new-generation population genes in the S6 and the genes retained in the S7, then returning to perform the S3; and
S9: obtaining an optimal target corresponding to the dual arms.

2. The method of claim 1, wherein the fitness function in the S1 specifically comprises a symmetric fitness subfunction, a dual-arm collaborative capability fitness subfunction, and a dual-arm synchronization fitness subfunction, which are weighted for calculation; in addition, a weight value of each fitness subfunction is adjusted based on its iteration depth in the quantity of iterations.

3. The method of claim 2, wherein the symmetric fitness subfunction considers symmetry of the two grasping points in each group of genes relative to the centroid of the rod member, and corresponding formulas are as follows:

$$^m f_{1n} = \frac{1}{\Delta^m x_n^2 + \Delta^m y_n^2 + \Delta^m z_n^2},$$

$$\Delta^m x_n = {}^m \frac{{}^m x_{Ln} - {}^m x_{Ln}}{2} - {}^m x_M,$$

$$\Delta^m y_n = \frac{{}^m y_{Ln} - {}^m y_{Rn}}{2} - {}^m y_M,$$

$$\Delta^m z_n = \frac{{}^m z_{Ln} - \Delta^m z_{Rn}}{2} \Delta^m z_M,$$

wherein, $^m f_{1n}$ represents the symmetric fitness subfunction, $(x_M, y_M, z_M)$ represents coordinates of the center of gravity of the to-be-grasped rod member, $\Delta x, \Delta y, \Delta z$ represents the coordinate difference between the center of the line connecting the two target grasping points and the centroid of the rod member, subscripts L and R respectively represent left and right arms, superscript m represents the gene number in each generation of population, and subscript n represents the sequence number of the generation to which the population belongs.

4. The method of claim 2, wherein the dual-arm collaborative capability fitness subfunction considers the joint with longest running time and a sum of the rotation angle of each joint, and the corresponding formula is as follows:

$$^m f_{2n} = \min\left\{\frac{1}{^m\Theta_{Ln}}, \frac{1}{^m\Theta_{Rn}}\right\},$$

wherein, $^m f_{2n}$ represents the dual-arm collaborative capability fitness subfunction, and $\Theta$ represents the sum of the rotation angle of each joint of a robotic arm from an initial posture to a target posture;

the dual-arm synchronization fitness subfunction is intended to ensure the synchronization between the dual arms reaching the target points as much as possible, and the corresponding formula is as follows:

$$^m f_{3n} = \frac{1}{|\max^m \theta_{Ln} - \max^n \theta_{Rn}|},$$

wherein, $^m f_{3n}$ represents the dual-arm synchronization fitness subfunction, and $\theta_L, \theta_R$ represents a rotation angle of each joint of the left and right arms.

5. The method of claim 2, wherein adjusting the weight value of each fitness subfunction based on its iteration depth in the quantity of iterations is specifically as follows: in the early stage of the iteration, a same weight is allocated to the three fitness subfunctions; and in the later stage of the iteration, proportions of the dual-arm collaborative capability fitness subfunction and the dual-arm synchronization fitness subfunction are increased.

6. The method of claim 1, wherein specific content of the crossover and mutation operations in the S6 is as follows: the crossover and mutation operations employ an adaptive adjustment technique for the probability, and use, based on the initial crossover and mutation ratios in the S1, the fitness function as a parameter to guide a change to the crossover and mutation ratios.

7. The method of claim 6, wherein the gene retention strategy in the S7 combines a roulette wheel method and a coverage method, in the early stage of the iteration, the roulette wheel method is used, and in the later stage of the iteration, the coverage method is used based on the fitness value.

8. A non-transitory computer-readable storage medium configured to store a computer program, wherein when the computer program runs on a computer, the computer executes the method of claim 1.

9. The non-transitory computer-readable storage medium of claim 8, wherein in the method, the fitness function in the S1 specifically comprises a symmetric fitness subfunction, a dual-arm collaborative capability fitness subfunction, and a dual-arm synchronization fitness subfunction, which are weighted for calculation; in addition, a weight value of each fitness subfunction is adjusted based on its iteration depth in the quantity of iterations.

10. The non-transitory computer-readable storage medium of claim 9, wherein in the method, the symmetric fitness subfunction considers symmetry of the two grasping points in each group of genes relative to the centroid of the rod member, and corresponding formulas are as follows:

$$^m f_{1n} = \frac{1}{\Delta^m x_n^2 + \Delta^m y_n^2 + \Delta^m z_n^2},$$

$$\Delta^m x_n^2 = {}^m\frac{^m x_{Ln}^2 - {}^m x_{Ln}^2}{2} - {}^m x_M,$$

$$\Delta^m y_n = \frac{^m y_{Ln}^2 - {}^m y_{Rn}^2}{2} - {}^m y_M,$$

$$\Delta^m z_n = \frac{^m z_{Ln} - \Delta^m z_{Rn}}{2} \Delta^m z_M,$$

wherein, $^m f_{1n}$ represents the symmetric fitness subfunction, $(x_M, y_M, z_M)$ represents coordinates of the center of gravity of the to-be-grasped rod member, $\Delta x, \Delta y, \Delta z$ represents the coordinate difference between the center of the line connecting the two target grasping points and the centroid of the rod member, subscripts L and R respectively represent left and right arms, superscript m represents the gene number in each generation of population, and subscript n represents the sequence number of the generation to which the population belongs.

11. The non-transitory computer-readable storage medium of claim 9, wherein in the method, the dual-arm collaborative capability fitness subfunction considers the joint with longest running time and a sum of the rotation angle of each joint, and the corresponding formula is as follows:

$$^m f_{2n} = \min\left\{\frac{1}{^m\Theta_{Ln}}, \frac{1}{^m\Theta_{Rn}}\right\},$$

wherein, $^m f_{2n}$ represents the dual-arm collaborative capability fitness subfunction, and $\Theta$ represents the sum of the rotation angle of each joint of a robotic arm from an initial posture to a target posture;

the dual-arm synchronization fitness subfunction is intended to ensure the synchronization between the dual arms reaching the target points as much as possible, and the corresponding formula is as follows:

$$^m f_{3n} = \frac{1}{|\max^m \theta_{Ln} - \max^n \theta_{Rn}|},$$

wherein, $^m f_{3n}$ represents the dual-arm synchronization fitness subfunction, and $\theta_L, \theta_R$ represents a rotation angle of each joint of the left and right arms.

12. The non-transitory computer-readable storage medium of claim 9, wherein in the method, adjusting the weight value of each fitness subfunction based on its iteration depth in the quantity of iterations is specifically as follows: in the early stage of the iteration, a same weight is allocated to the three fitness subfunctions; and in the later stage of the iteration, proportions of the dual-arm collaborative capability fitness subfunction and the dual-arm synchronization fitness subfunction are increased.

13. The non-transitory computer-readable storage medium of claim 8, wherein in the method, specific content of the crossover and mutation operations in the S6 is as follows: the crossover and mutation operations employ an adaptive adjustment technique for the probability, and use, based on the initial crossover and mutation ratios in the S1, the fitness function as a parameter to guide a change to the crossover and mutation ratios.

14. The non-transitory computer-readable storage medium of claim 13, wherein in the method, the gene retention strategy in the S7 combines a roulette wheel method and a coverage method, in the early stage of the iteration, the roulette wheel method is used, and in the later stage of the iteration, the coverage method is used based on the fitness value.

15. A system for selecting a grasp posture of a dual-arm robot, comprising:
  a parameter setting module, configured to: determine a value range of a fitness function and an iteration quantity threshold with a goal of minimizing the posture variation at the end effectors of dual arms, design the fitness function based on a position relationship between the dual arms and the to-be-grasped rod member and motion laws of the dual arms, and set initial crossover and mutation ratios;
  a generation module, configured to take initial postures of the dual arms and the position of the target to-be-grasped rod member as constraints for generating an initial population, and generate an initial population representing a grasping position; the above specific content of taking the initial posture of the dual arms and the position of the target to-be-grasped rod member as constraints for generating an initial population are as follows: the target grasping points are generated on the axis of the target object to be grasped, and the initial population of each gene group contains two points representing the dual-arm target positions distributed on both sides of the object's centroid;
  a calculation module, configured to calculate fitness of each group of genes in the population based on the fitness function designed by the parameter setting module;
  a determining module, configured to perform two-step determining, where the first step is to determine whether the fitness calculated by the calculation module for each group of genes in the population is within the value range set by the parameter setting module for the fitness function, if it does, obtain an optimal target corresponding to the dual arms, or otherwise, then perform to the second step, checking if the iteration count reaches the threshold value set in the parameter setting module, if it does, the optimal targets for the dual arms are obtained, otherwise, it execute the crossover and mutation module;
  a crossover and mutation module, configured to obtain a new-generation population gene through crossover and mutation operations;
  a gene retention module, configured to: for a population gene that is not processed by the crossover and mutation module, dynamically select a gene retention strategy based on an iteration depth of the population gene in the quantity of iterations, a fitness value, the grasping position, and postures at the tail ends of the dual arms, to retain the gene; and
  an update module, configured to update, based on the new-generation population gene obtained by the crossover and mutation module and the gene retained by the gene retention module, a population gene representing the grasping position, and return to the calculation module until the optimal target corresponding to the dual arms is obtained.

* * * * *